US010416674B2

United States Patent
Xu et al.

(10) Patent No.: US 10,416,674 B2
(45) Date of Patent: Sep. 17, 2019

(54) WHEEL DIAMETER COMPENSATION METHOD AND APPARATUS FOR ROBOT

(71) Applicant: Hangzhou Yameilijia Technology Co., Ltd., Hangzhou (CN)

(72) Inventors: Juejing Xu, Hangzhou (CN); Jianqiang Zhu, Hangzhou (CN)

(73) Assignee: Hangzhou Yameilijia Technology Co., Ltd., Hangzhou (CN)

( * ) Notice: Subject to any disclaimer, the term of this patent is extended or adjusted under 35 U.S.C. 154(b) by 0 days.

(21) Appl. No.: 15/326,624

(22) PCT Filed: Aug. 3, 2016

(86) PCT No.: PCT/CN2016/093113
§ 371 (c)(1),
(2) Date: Jan. 16, 2017

(87) PCT Pub. No.: WO2017/118000
PCT Pub. Date: Jul. 13, 2017

(65) Prior Publication Data
US 2018/0335782 A1    Nov. 22, 2018

(30) Foreign Application Priority Data

Jan. 4, 2016 (CN) .......................... 2016 1 0006147
Jan. 4, 2016 (CN) .......................... 2016 1 0008143

(51) Int. Cl.
*G05D 1/02* (2006.01)
*G07C 5/08* (2006.01)
(Continued)

(52) U.S. Cl.
CPC .............. *G05D 1/0212* (2013.01); *B25J 5/00* (2013.01); *B25J 19/00* (2013.01); *G05D 1/0234* (2013.01);
(Continued)

(58) Field of Classification Search
CPC .............. G05D 1/0212; G05D 1/0234; G05D 2201/0216; G07C 5/006; G07C 5/0808
See application file for complete search history.

(56) References Cited

U.S. PATENT DOCUMENTS 5,535,306 A    7/1996 Stevens
2003/0225490 A1* 12/2003 Kane .................... B61L 25/021
701/19
(Continued)

FOREIGN PATENT DOCUMENTS

CN    102269995 A    12/2011
CN    103487047 A    1/2014
(Continued)

OTHER PUBLICATIONS

"International Application No. PCT/CN2016/093113, International Search Report and Written Opinion dated Nov. 9, 2016", (Nov. 9, 2016), 7 pgs.

*Primary Examiner* — Thomas G Black
*Assistant Examiner* — Ce Li Li
(74) *Attorney, Agent, or Firm* — Schwegman Lundberg & Woessner, P.A.

(57) ABSTRACT

Wheel diameter compensation method and apparatus for a robot, wherein the method comprises: receiving, by a robot at a first location point in a work place where multiple location points are set, a travel instruction, sent from a server, wherein the travel instruction instructs it to travel to a second location point and includes a distance between the first and the second location points and a travel direction towards the second location point from the first location point; acquiring, by the robot, a travelling deviation corresponding to travelling from the first location point to the second location point, the travelling deviation being a difference between a theoretical distance and an actual distance corresponding to actual number of tire revolutions of the
(Continued)

robot; and correcting, by the robot, a current wheel diameter of the robot based on the travelling deviation and the distance between the first and the second location points.

22 Claims, 4 Drawing Sheets

(51) Int. Cl.
    *B25J 5/00*            (2006.01)
    *B25J 19/00*         (2006.01)
    *G07C 5/00*           (2006.01)
    *G01C 22/00*        (2006.01)

(52) U.S. Cl.
    CPC ........... *G05D 1/0272* (2013.01); *G07C 5/006* (2013.01); *G07C 5/0808* (2013.01); *G01C 22/00* (2013.01); *G05D 2201/0216* (2013.01)

(56) References Cited

U.S. PATENT DOCUMENTS

| | | | | |
|---|---|---|---|---|
| 2004/0006411 | A1* | 1/2004 | Kane | B61K 9/12 701/1 |
| 2004/0046650 | A1* | 3/2004 | Yanase | B60C 23/061 340/444 |
| 2004/0134269 | A1* | 7/2004 | Sugisawa | B60C 23/061 73/146 |
| 2004/0181320 | A1* | 9/2004 | Kane | B61L 25/021 701/19 |
| 2006/0235609 | A1* | 10/2006 | Makela | G01C 22/00 701/518 |
| 2007/0095988 | A1* | 5/2007 | Kane | B61K 9/12 246/182 R |
| 2007/0112482 | A1* | 5/2007 | Kane | B61K 9/12 701/19 |
| 2010/0114428 | A1* | 5/2010 | Kurata | B60W 40/1005 701/36 |
| 2010/0262396 | A1* | 10/2010 | Kircher | B60W 40/105 702/96 |
| 2013/0090830 | A1* | 4/2013 | Eisele | B60K 31/00 701/93 |
| 2015/0094900 | A1* | 4/2015 | Bell | G05D 1/0246 701/28 |
| 2015/0198440 | A1* | 7/2015 | Pearlman | G01S 17/023 356/4.01 |
| 2016/0282226 | A1* | 9/2016 | Lavoie | B60C 99/00 |
| 2016/0349061 | A1* | 12/2016 | Fanselow | G01C 21/206 |

FOREIGN PATENT DOCUMENTS

| | | |
|---|---|---|
| CN | 204844150 U | 12/2015 |
| CN | 105437261 A | 3/2016 |
| CN | 105573322 A | 5/2016 |
| EP | 0740982 A2 | 11/1996 |
| JP | 2006162384 A * | 6/2006 |
| JP | 5428639 B2 | 2/2014 |
| WO | WO-03101677 A1 | 12/2003 |

* cited by examiner

WHEEL DIAMETER COMPENSATION METHOD AND APPARATUS FOR ROBOT

This application is a U.S. National Stage Filing under 35 U.S.C. 371 from International Application No. PCT/CN2016/093113, filed on Aug. 3, 2016, which claims the benefit of priority to China Patent Application No. 201610008143.6, filed on Jan. 4, 2016, and which claims the benefit of priority to China Patent Application No. 201610006147.0, filed on Jan. 4, 2016, each of which is hereby incorporated by reference herein in its entirety.

TECHNICAL FIELD

The present invention relates to the technical field of robots, and in particular to a wheel diameter compensation method and apparatus for a robot.

Background Art

At present, with the rapid development of social economy and the wide application of smart products, the scale and quantity of large-scale places for people or logistics, such as supermarkets, airports, stations, exhibition centers and logistics warehouses and so on, are increased continuously. The past people-oriented model has failed to meet the actual needs. Therefore, more and more automated robots capable of working autonomously have involved themselves in the fields of baggage transportation in airports, logistics distribution, and so on. An automated robot is a multi-function system integrated with environmental perception, route planning, dynamic decision, behavior control and alarm modules, and can realize timed and mobile autonomous working. Automated robots can replace manpower for operations such as transportation, carrying, sorting, storage and packaging of goods. With automated robots, the work efficiency in the logistics industry can be greatly improved, and the working cost can be reduced.

With the vigorous development of the sorting industry, automated robots have also been widely applied to the express delivery sorting industry, and then have replaced staffs to perform operations relating to sorting and delivery of goods. Currently, when automated robots are used to transport, sort and pack goods in a logistics distribution center, a large number of robots are usually provided in the place, and there is a background server which controls each of the robots to travel according to a control instruction, so as to ensure that all the robots in the place work in order. Meanwhile, the robots determine the number of tire revolutions required to travel from a current location point to another location point by the following step of: calculating the number of tire revolutions required to travel from the current location point to another location point based on a distance between the current location point and another location point issued by a server and a tire wheel diameter pre-stored in them, and then the robots travel to the another location pointed based on the calculated number of tire revolutions. However, as the robots have travelled for a long time, which may result in tire wear of the robots, there will be a large error in the calculated number of tire revolutions.

In carrying out the present invention, the inventors have found that there are at least the following problems in the related art: there is a deviation between the actual wheel diameter and the pre-stored tire wheel diameter due to the presence of tire wear in the use of robots; thus the calculation of the number of tire revolutions, required for a robot to travel from the current location point to another location point by the tire wheel diameter pre-stored therein, has a low accuracy; and therefore, on the one hand, this leads to a low accuracy of the travelling distance of the robot, making it impossible to accurately position the robot, or even causing mutual collisions between robots; and on the other hand, if the tire of the robot is worn to a certain extent, the robot is prone to travelling incorrectly, and thus collides with other robots.

However, there is no good solution in the prior art to avoid the problems that it is impossible to realize accurately positioning of robots and collisions between robots may occur due to tire wear of the robots.

DISCLOSURE OF THE INVENTION

In view of the above, the present invention provides a wheel diameter compensation method and apparatus for a robot, in order to solve the problems that the accuracy of a distance travelled by the robot is low as a result of the presence of tire friction during travelling of the robot, making it impossible to realize accurate positioning of the robot and causing collisions between robots, and in order to remind tire replacement if a tire of the robot is worn to a certain extent, so as to further alleviate the problem of collisions between robots.

To achieve the above object, in a first aspect, embodiments of the present invention provide a wheel diameter compensation method for a robot, the method including:

receiving, by a robot at a first location point in a work place, a travel instruction sent from a server, wherein the travel instruction instructs the robot to travel to a second location point, wherein a plurality of location points are set in the work place, and the travel instruction includes a distance between the first location point and the second location point and a travel direction towards the second location point from the first location point;

acquiring, by the robot, a travelling deviation corresponding to travelling from the first location point to the second location point, the travelling deviation being a difference between a theoretical distance corresponding to actual number of tire revolutions of the robot and an actual distance; and the robot correcting its own current wheel diameter based on the travelling deviation and a distance between the first location point and the second location point.

In combination with the first aspect, the embodiments of the present invention provide a first possible embodiment of the first aspect, wherein the acquiring, by the robot, a travelling deviation corresponding to travelling from the first location point to the second location point includes:

the robot acquiring a first displacement deviation of the robot from the first location point and travelling to the second location point in accordance with the distance and the travel direction included in the travel instruction;

the robot acquiring a second displacement deviation of the robot itself from the second location point when the robot travels to the second location point; and the robot calculating the travelling deviation corresponding to the robot travelling from the first location point to the second location point based on the first displacement deviation and the second displacement deviation.

In combination with the first aspect, the embodiments of the present invention provide a second possible embodiment of the first aspect, wherein the robot correcting its own current wheel diameter based on the travelling deviation and a distance between the first location point and the second location point includes:

the robot calculating its own travelling deviation per unit distance based on the travelling deviation and the distance between the first location point and the second location point;

the robot searching in a preset list to obtain a wheel diameter compensation value corresponding to the travelling deviation per unit distance; and the robot correcting its own current wheel diameter based on the searched wheel diameter compensation value.

In combination with the first aspect, the embodiments of the present invention provide a third possible embodiment of the first aspect, wherein the step of the robot correcting its own current wheel diameter of the robot based on the travelling deviation and the distance between the first location point and the second location point includes:

the robot determining first number of tire revolutions thereof based on the pre-stored current wheel diameter and the distance between the first location point and the second location point;

the robot determining second number of tire revolutions thereof based on the distance between the first location point and the second location point, the travelling deviation and a corrected current wheel diameter; and the robot calculating a corrected current wheel diameter using a relationship where the first number of tire revolutions is equal to the second number of tire revolutions, and updating the robot's own current wheel diameter with the corrected current wheel diameter.

In combination with the first aspect, the embodiments of the present invention provide a fourth possible embodiment of the first aspect, wherein the method further includes:

the robot calculating number of tire revolutions required to travel to the second location point, based on the second displacement deviation of the robot itself from the second location point; and controlling the robot to travel to the second location point based on the required number of tire revolutions so as to correct a final position of the robot.

In combination with the first aspect, the embodiments of the present invention provide a fifth possible embodiment of the first aspect, wherein the method further includes judging whether the robot needs to have the tire replaced based on the corrected current wheel diameter, and performing, when it is judged that the robot needs to have the tire replaced, a tire replacement early-warning.

In combination with the first aspect, the embodiments of the present invention provide a sixth possible embodiment of the first aspect, wherein the judging whether the robot needs to have the tire replaced based on the corrected current wheel diameter includes:

judging whether the corrected current wheel diameter reaches a preset range of wheel diameters, wherein if yes, it is determined that the robot needs to have the tire replaced; or judging whether a difference between the corrected current wheel diameter and an initial wheel diameter of the robot reaches a preset difference threshold, wherein if yes, it is determined that the robot needs to have the tire replaced.

In a second aspect, the embodiments of the present invention provide a wheel diameter compensation apparatus for a robot, the apparatus including:

a receiving module configured to receive a travel instruction sent from a server, wherein the travel instruction instructs the robot to travel from a first location point to a second location point, wherein a plurality of location points are set in the work place, and the travel instruction includes a distance between the first location point and the second location point and a travel direction towards the second location point from the first location point;

a travelling deviation calculation module configured to acquire a travelling deviation corresponding to travelling from the first location point to the second location point, the travelling deviation being a difference between a theoretical distance corresponding to actual number of tire revolutions of the robot and an actual distance; and a correcting module configured to correct a current wheel diameter of the robot based on the travelling deviation and a distance between the first location point and the second location point.

In combination with the second aspect, the embodiments of the present invention provide a first possible embodiment of the second aspect, wherein the travelling deviation calculation module includes:

a first acquiring unit configured to acquire a first displacement deviation of the robot from the first location point and make the robot travel to the second location point in accordance with the distance and the travel direction included in the travel instruction;

a second acquiring unit configured to acquire a second displacement deviation of the robot from the second location point when the robot travels to the second location point; and a travelling deviation calculation unit configured to calculate to obtain the travelling deviation corresponding to the robot travelling from the first location point to the second location point based on the first displacement deviation and the second displacement deviation.

In combination with the second aspect, the embodiments of the present invention provide a second possible embodiment of the second aspect, wherein the correcting module includes:

a deviation-per-unit-distance calculation subunit configured to calculate, based on the travelling deviation and the distance between the first location point and the second location point, a travelling deviation per unit distance of the robot;

a wheel diameter compensation value searching subunit configured to search in a preset list to obtain a wheel diameter compensation value corresponding to the travelling deviation per unit distance; and a current wheel diameter correcting subunit configured to correct the current wheel diameter of the robot based on the searched wheel diameter compensation value.

In combination with the second aspect, the embodiments of the present invention provide a third possible embodiment of the second aspect, wherein the correcting module includes:

a first determining subunit configured to determine first number of tire revolutions of the robot based on the pre-stored current wheel diameter and the distance between the first location point and the second location point;

a second determining subunit configured to determine second number of tire revolutions of the robot based on the distance between the first location point and the second location point, the travelling deviation, and a corrected current wheel diameter; and a current wheel diameter updating subunit configured to calculate a corrected current wheel diameter using the relationship where the first number of tire revolutions is equal to the second number of tire revolutions, and update the current wheel diameter of the robot with the corrected current wheel diameter.

In combination with the second aspect, the embodiments of the present invention provide a fourth possible embodiment of the second aspect, wherein the apparatus further includes:

a compensation revolution number calculation module configured to calculate to obtain number of tire revolutions required for the robot to travel to the second location point based on the second displacement deviation of the robot from the second location point; and a controlling module configured to control the robot to travel to the second location point based on the required number of tire revolutions, thereby correcting a final position of the robot.

In combination with the second aspect, the embodiments of the present invention provide a fifth possible embodiment of the second aspect, wherein the apparatus further includes:

a judging module configured to judge, based on the corrected current wheel diameter, whether the robot needs to have the tire replaced, and perform, when it is judged that the robot needs to have the tire replaced, a tire replacement early-warning.

In combination with the second aspect, the embodiments of the present invention provide a sixth possible embodiment of the second aspect, wherein the judging module includes:

a first judging unit configured to judge whether the corrected current wheel diameter reaches a preset range of wheel diameters, wherein if yes, it is determined that the robot needs to have the tire replaced;

or a second judging unit configured to judge whether a difference between the corrected current wheel diameter and an initial wheel diameter of the robot reaches a preset difference threshold, wherein if yes, it is determined that the robot needs to have the tire replaced.

In a third aspect, the embodiments of the present invention provide another wheel diameter compensation method for a robot, the method including:

acquiring a travelling deviation corresponding to the robot travelling from a first location point to a second location point in a work place and a distance between the first location point and the second location point; wherein a plurality of location points are set in the work place, and the travelling deviation is a difference between a theoretical distance corresponding to the actual number of tire revolutions of the robot and an actual distance; and updating a current wheel diameter of the robot based on the travelling deviation and the distance between the first location point and the second location point.

In combination with the third aspect, the embodiments of the present invention provide a first possible embodiment of the third aspect, wherein the acquiring the travelling deviation corresponding to the robot travelling from the first location point to the second location point in the work place includes:

receiving a reported first displacement deviation of the robot from the first location point when the robot is located at the first location point, and a reported second displacement deviation of the robot from the second location point when the robot is located at the second location point; and calculating the travelling deviation corresponding to the robot travelling from the first location point to the second location point based on the first displacement deviation and the second displacement deviation.

In combination with the third aspect, the embodiments of the present invention provide a second possible embodiment of the third aspect, wherein the updating the current wheel diameter of the robot based on the travelling deviation and the distance between the first location point and the second location point includes:

calculating, based on the travelling deviation and the distance between the first location point and the second location point, a travelling deviation per unit distance of the robot;

searching in a preset list a wheel diameter compensation value corresponding to the travelling deviation per unit distance of the robot; and updating the current wheel diameter of the robot based on the searched wheel diameter compensation value.

In combination with the third aspect, the embodiments of the present invention provide a third possible embodiment of the third aspect, wherein the updating the current wheel diameter of the robot based on the travelling deviation and the distance between the first location point and the second location point includes:

determining first number of tire revolutions of the robot based on the current wheel diameter and the distance between the first location point and the second location point;

determining second number of tire revolutions of the robot based on the distance between the first location point and the second location point, the travelling deviation and an updated wheel diameter of the robot; and calculating an updated wheel diameter of the robot using the relationship where the first number of tire revolutions is equal to the second number of tire revolutions.

In combination with the third aspect, the embodiments of the present invention provide a fourth possible embodiment of the third aspect, wherein the method further includes:

judging whether the robot needs to have the tire replaced based on the updated current wheel diameter, and performing, when it is judged that the robot needs to have the tire replaced, a tire replacement early-warning.

In combination with the third aspect, the embodiments of the present invention provide a fifth possible embodiment of the third aspect, wherein the judging whether the robot needs to have the tire replaced based on the updated current wheel diameter includes:

judging whether the updated current wheel diameter reaches a preset range of wheel diameters, wherein if yes, it is determined that the robot needs to have the tire replaced;

or judging whether a difference between the updated current wheel diameter and an initial wheel diameter of the robot reaches a preset difference threshold, wherein if yes, it is determined that the robot needs to have the tire replaced.

In a fourth aspect, the embodiments of the present invention provide a wheel diameter compensation apparatus for a robot, the apparatus including:

an acquiring module configured to acquire a travelling deviation corresponding to the robot travelling from a first location point to a second location point in a work place and a distance between the first location point and the second location point, wherein a plurality of location points are set in the work place, and the travelling deviation is a difference between a theoretical distance corresponding to the actual number of tire revolutions of the robot and an actual distance; and a wheel diameter updating module configured to update a current wheel diameter of the robot based on the travelling deviation and the distance between the first location point and the second location point.

In combination with the fourth aspect, the embodiments of the present invention provide a first possible embodiment of the fourth aspect, wherein the acquiring module includes:

a displacement deviation receiving unit configured to receive a reported first displacement deviation of the robot from the first location point when the robot is located at the first location point, and a reported second displacement deviation of the robot from the second location point when the robot is located at the second location point; and a travelling deviation calculation unit configured to calculate the travelling deviation corresponding to the robot travelling from the first location point to the second location point based on the first displacement deviation and the second displacement deviation.

In combination with the fourth aspect, the embodiments of the present invention provide a second possible embodiment of the fourth aspect, wherein the wheel diameter updating module includes:

a travelling-deviation-per-unit-distance calculation unit configured to calculate, based on the travelling deviation and the distance between the first location point and the second location point, a travelling deviation per unit distance of the robot;

a wheel diameter compensation value searching unit configured to search in a preset list a wheel diameter compensation value corresponding to the travelling deviation per unit distance of the robot; and a current wheel diameter updating unit configured to update the current wheel diameter of the robot based on the searched wheel diameter compensation value.

In combination with the fourth aspect, the embodiments of the present invention provide a third possible embodiment of the fourth aspect, wherein the wheel diameter updating module includes:

a first determining unit configured to determine first number of tire revolutions of the robot based on the current wheel diameter of the robot and the distance between the first location point and the second location point;

a second determining unit configured to determine second number of tire revolutions of the robot based on the distance between the first location point and the second location point, the travelling deviation, and an updated wheel diameter of the robot; and a wheel diameter calculation unit configured to calculate an updated wheel diameter of the robot using the relationship where the first number of tire revolutions is equal to the second number of tire revolutions.

In combination with the fourth aspect, the embodiments of the present invention provide a fourth possible embodiment of the fourth aspect, wherein the apparatus further includes:

a judging module configured to judge whether the robot needs to have the tire replaced based on the updated current wheel diameter size, and perform, when it is judged that the robot needs to have the tire replaced, a tire replacement early-warning.

In combination with the fourth aspect, the embodiments of the present invention provide a fifth possible embodiment of the fourth aspect, wherein the judging module includes:

a first judging unit configured to judge whether the updated current wheel diameter reaches a preset range of wheel diameters, wherein if yes, it is determined that the robot needs to have the tire replaced;

or a second judging unit configured to judge whether a difference between the updated current wheel diameter and an initial wheel diameter of the robot reaches a preset difference threshold, wherein if yes, it is determined that the robot needs to have the tire replaced.

In the embodiments of the present invention, on the one hand, a robot at a first location point in a work place receives a travel instruction sent from a server, with the travel instruction instructing the robot to travel to a second location point, wherein a plurality of location points are set in the work place, and the travel instruction includes a distance between the first location point and the second location point and a travel direction towards the second location point from the first location point; the robot acquires a travelling deviation corresponding to travelling from the first location point to the second location point, the travelling deviation being a difference between a theoretical distance corresponding to the actual number of tire revolutions of the robot and an actual distance; and the robot corrects a current wheel diameter of the robot based on the distance between the first location point and the second location point and the travelling deviation; or acquires a travelling deviation corresponding to the robot travelling from the first location point to the second location point and a distance between the first location point and the second location point, and then corrects the current wheel diameter of the robot based on the distance between the first location point and the second location point and the travelling deviation. On the other hand, a travelling deviation corresponding to the robot travelling from a first location point to a second location point in a work place and a distance between the first location point and the second location point are acquired; wherein a plurality of location points are set in the work place, and the travelling deviation is a difference between a theoretical distance corresponding to the actual number of tire revolutions of the robot and an actual distance; and a current wheel diameter of the robot is updated based on the distance between the first location point and the second location point and the travelling deviation. With the methods and apparatuses of the present embodiments, if a tire of the robot tire is worn, the tire is compensated for to improve the accuracy of a distance travelled by the robot, realizing accurate positioning of the robot; and furthermore if the tire of the robot is worn to a certain extent, it is able to remind tire replacement to further alleviate the problem in the prior art that a robot collides with other robots due to tire wear.

BRIEF DESCRIPTION OF DRAWINGS

In order to illustrate the technical solutions of embodiments of the present invention more clearly, drawings required for use in the embodiments will be introduced briefly below. It should be understood that the drawings below are merely illustrative of some embodiments of the present invention and are therefore not to be considered limiting of its scope. It would be understood by those skilled in the art that other relevant drawings could be derived from these drawings without using inventive efforts.

DETAILED DESCRIPTION OF EMBODIMENTS

In order to make the objects, technical solutions and advantages of the embodiments of the present invention more clear, the technical solutions of the embodiments of the present invention will be described clearly and completely with reference to the drawings of the embodiments of the present invention. It is apparent that the embodiments described are some, but not all of the embodiments of the present invention. Generally, the components of the embodiments of the present invention, as described and illustrated in the figures herein, may be arranged and designed in a wide variety of different configurations. Thus, the following detailed description of the embodiments of the present invention, as represented in the figures, is not intended to limit the scope of the present invention as claimed, but is merely representative of selected embodiments of the present invention. All the other embodiments obtained by those skilled in the art in light of the embodiments of the present invention without inventive efforts would fall within the scope of the present invention as claimed.

Considering that there is no good solution in the prior art for avoiding the problems that it is impossible to realize accurately positioning of robots and collisions between robots may occur due to tire wear of the robots, the present invention provides a wheel diameter compensation method and an apparatus for a robot, which compensate for a tire of a robot if it is worn, thereby improving the accuracy of the distance travelled by the robot and realizing accurate positioning of the robot, and furthermore which are capable of reminding tire replacement if the tire of the robot is worn to a certain extent, thereby alleviating the problem in the prior art that robot collides with other robots due to tire wear. Specific description will be given below with reference to the embodiments.

Embodiment 1

Figure 1:
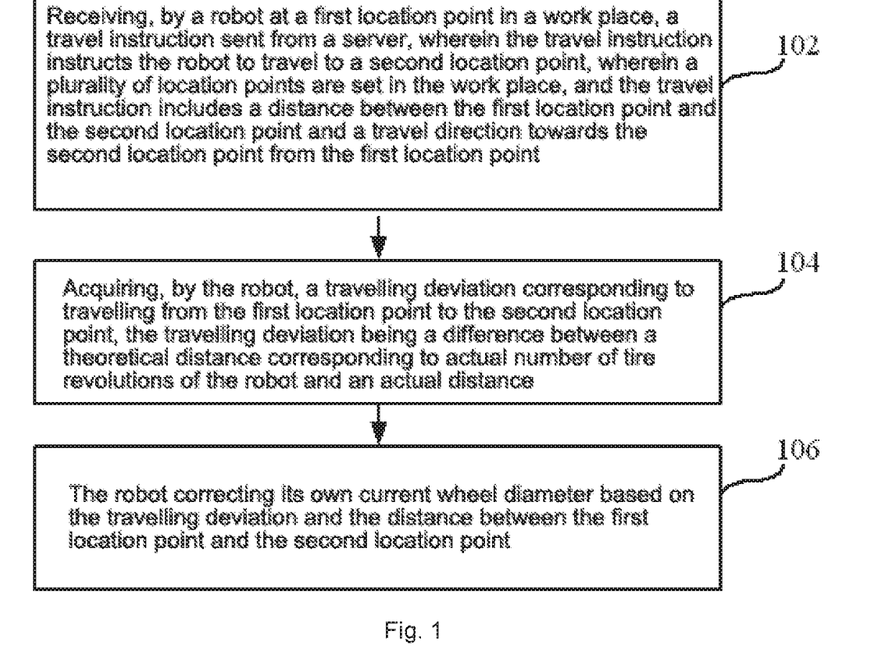
FIG. 1 shows a flowchart of a wheel diameter compensation method for a robot provided according to Embodiment 1 of the present invention.

As shown in FIG. 1 which shows a flowchart of a wheel diameter compensation method for a robot provided according to an embodiment of the present invention, a subject executing the method is located in a robot, and the method includes Steps 102 to 106 specified as follows:

102: receiving, by a robot at a first location point in a work place a travel instruction sent from a server, wherein the travel instruction above instructs the robot to travel to a second location point, wherein a plurality of location points are set in the work place, and the travel instruction above includes a distance between the first location point and the second location point and a travel direction towards the second location point from the first location point;

104: acquiring, by the robot, a travelling deviation corresponding to travelling from the first location point to the second location point, the travelling deviation being a difference between a theoretical distance corresponding to the actual number of tire revolutions of the robot and an actual distance; and

106: the robot correcting its own current wheel diameter based on the distance between the first location point and the second location point and the travelling deviation.

In Step 102 above, specifically, the server issues, to the robot, a travelling distance and a travel direction for a travel from the first location point to a designated location point which is the second location point in the work place.

In Step 104, specifically, the acquiring by the robot a travelling deviation corresponding to travelling from the first location point to the second location point includes the following processes: (1) the robot acquires a first displacement deviation thereof from the first location point, and travels to the second location point above in accordance with the distance above and the travel direction above included in the travel instruction, wherein the first displacement deviation is obtained in such a manner that the robot collects an optical identification code corresponding to the first location point through an optical identifier at a bottom when the robot is located at the first location point. In a collected image, a center of the image represents a center of the position of the robot. The robot identifies a center of the optical identification code from the collected image and determines a distance between the center of the optical identification code and the center of the image so as to determine the first displacement deviation of the robot from the first location point; (2) when the robot travels to the second location point, the robot above acquires a second displacement deviation thereof from the second location point, wherein the second displacement deviation is obtained in the same manner as the first displacement deviation; and (3) the robot calculates to obtain the travelling deviation corresponding to the robot travelling from the first location point to the second location point based on the first displacement deviation and the second displacement deviation.

Specifically, in the embodiment of the present invention, the place, where the robot works, is divided, in a tabular form, into several lattices with equal areas, each lattice serving as a location point. Each lattice is provided therein with an optical identification code, a center of the optical identification code coincides with a center of a corresponding location point, and the optical identification code may be a two-dimensional code. The bottom of the robot is provided with an optical identifier which is configured to identify the optical identification code and the optical identification code may be a camera head. In process (1), when the robot is at the first location point, the robot collects the optical identification code corresponding to the first location point through the optical identifier at the bottom of the robot. In a collected image, a center of the image represents a center of the position of the robot. The robot identifies a center of the optical identification code from the collected image and determines a distance between the center of the optical identification code and the center of the image so as to determine a first displacement deviation of the robot from the first location point, and stores the first displacement deviation. Similarly, in process (2), when the robot is at the second location point, the robot determines a second displacement deviation thereof from the second location point in the same way, and stores the second displacement deviation. Then, in process (3), the robot calculates to obtain the travelling deviation corresponding to the robot travelling from the first location point to the second location point based on the first displacement deviation, the second displacement deviation and the distance between the first location point and the second location point.

For example, taking a forward direction as a positive direction, the first displacement deviation as 10 cm beyond the first location point, and the second displacement deviation as 5 cm beyond the second location point, it may be obtained by calculation that travelling of the robot from the first location point to the second location point corresponds to a travelling deviation of −5 cm, that is, the robot moves 5 cm less.

Here, in the embodiment provided according to the present invention, the specific calculation process relating to correction of the current wheel diameter is executed by the robot, the acquisition of the first displacement deviation and the acquisition of the second displacement deviation as well as the calculation of the travelling deviation corresponding to travelling from the first location point to the second location point based on the first displacement deviation, the second displacement deviation and the distance between the first location point and the second location point are executed at the robot side, and the server is only responsible for issuing the travel instruction to the corresponding robot, thus the server has a small amount of computation, which is especially suitable for work settings where the same server controls multiple robots.

Step 106 above specifically includes: (1) the robot above calculates, based on the distance between the first location point and the second location point and the travelling deviation, its own travelling deviation per unit distance; (2) the robot searches in a preset list a wheel diameter compensation value corresponding to the travelling deviation per unit distance; and (3) the robot corrects its own current wheel diameter based on the searched wheel diameter compensation value.

Specifically, taking a case where the robot has a travelling deviation of 5 cm and the distance between the first location point and the second location point is 5 meters or embodied as 5 positional intervals as an example, it may be calculated through the above process (1) that the travelling deviation per unit distance of the robot is 5 cm/5 meters, that is, there is a deviation of 1 cm per meter, whose numerical value is expressed as 0.01, or as a deviation of 1 cm per positional interval. In process (2) as above, a list, in which travelling deviations per unit distance correspond to wheel diameter compensation values, is preset in the robot, and taking a travelling deviation per unit distance of 0.01, or a deviation of 1 cm per positional interval as an example, it may be obtained by searching in the list above that a wheel diameter compensation value is 2 cm. In process (2), the wheel diameter compensation value may also be determined by way of judging with a preset value, and for example, if the travelling deviation per unit distance is more than 0.05, the wheel diameter compensation value will be 5 cm, and if the travelling deviation per unit distance is less than or equal to 0.05, the wheel diameter compensation value will be 2 cm. In process (3) as above, since the tire of the robot is less worn as the movement time increases, the current wheel diameter of the robot can be corrected to be 26 cm, taking a case, where the wheel diameter compensation value is 2 cm and the robot has a current wheel diameter of 28 cm, as an example.

In the embodiment provided according to the present invention, the robot has the advantages of simple operation and less computation burden for a server by determining the wheel diameter compensation value by means of searching in a list and is especially suitable for the case where the same server controls a large number of robots to work.

In order to accurately compensate for the wheel diameter of the robot and accurately determine the corrected wheel diameter, in Step 106, the robot correcting its own current wheel diameter based on the distance between the first location point and the second location point and the travelling deviation may also be carried out by the following processes: (1) the robot determines first number of tire revolutions thereof based on the distance between the first location point and the second location point and the pre-stored current wheel diameter; (2) the robot determines second number of tire revolutions thereof based on the distance between the first location point and the second location point, the travelling deviation and a corrected wheel diameter; and (3) the robot calculates to obtain a corrected wheel diameter using the relationship where the first number of tire revolutions is equal to the second number of tire revolutions, and updates its own current wheel diameter with the corrected wheel diameter.

Specifically, supposing that M represents the distance between the first location point and the second location point, Y represents the travelling deviation of the robot, R0 represents the current wheel diameter (i.e., the pre-stored current wheel diameter) of the robot, R1 represents the corrected wheel diameter (i.e., the actual wheel diameter after wear) of the robot, and pi indicates a ratio of a circle's circumference to its diameter. It can be seen that M refers to a theoretical distance travelled by the robot, and M+Y refers to an actual distance travelled by the robot. The travelling of the robot is based on the principle that number of tire revolutions of the robot is calculated based on the theoretical distance travelled by the robot and the current wheel diameter of the robot and the robot moves according to the number of revolutions, thus while the robot is moving from the first location point to the second location point, the theoretical number of tire revolutions of is equal to the actual number of tire revolutions, that is, $(M+Y)/(pi*R1)=M/(pi*R0)$, and since each of M, Y, pi, and R0 is known, the corrected wheel diameter of the robot can be obtained by $R1=((M+Y)*R0)/M$, which is simplified into $R1=R0+(Y*R0)/M$.

In the present embodiment, the corrected wheel diameter of the robot can be accurately calculated based on the principle that the theoretical number of tire revolutions of the robot is equal to the actual number of tire revolutions, thereby accurately correcting the wheel diameter of the robot.

Further, in order to ensure that the robot can accurately stop at the second location point each time the robot is travelling, so as to further ensure the accuracy of the positioning of the robot, the method above further includes:

the above robot calculating to obtain number of tire revolutions required to travel to the second location point based on the above second displacement deviation of the robot from the above second location point; and the above robot travelling to the second location point above based on the required number of tire revolutions above so as to correct a final position of the above robot.

For example, when the robot arrives at the second location point, the robot collects an optical identification code corresponding to the second location point by the optical identifier at a bottom, and determines a distance between the center of the optical identification code and the center of a collected image of the second location point, i.e., the second displacement deviation of the robot from the second location point. If the second displacement deviation is x cm and the center of the optical identification code in the travel direction is located in front of the center of the image of the second location point, this means that the robot needs to travel x centimeters more so as to be accurately positioned at the center of the second location point. In this case, it is necessary to calculate the number of tire revolutions required for arrival at the center of the second location point so that the robot continues travelling to the second location point. In the embodiment of the present invention, the robot is positioned more accurately by allowing the robot to continue travelling to the center of the second location point.

Still further, the method further includes: judging, based on the corrected current wheel diameter, whether the robot needs to have the tire replaced, and specifically includes: (1) judging whether the corrected current wheel diameter reaches a preset range of wheel diameters, wherein if yes, it is determined that the robot needs to have the tire replaced; or (2) judging whether a difference between the corrected current wheel diameter and an initial wheel diameter of the robot reaches a preset difference threshold, wherein if yes, it is determined that the robot needs to have the tire replaced. For example, if the robot is so worn that its wheel diameter becomes 25 cm, or if the difference between the corrected current wheel diameter of the robot and the initial wheel diameter of the robot exceeds 5 cm, it is determined that the robot needs to have the tire replaced. In the present embodiment, it is possible to simply and quickly judge, by processes (1) and (2), whether the tire of the robot needs to be replaced, so as to prevent the robot from colliding with other robots due to severe tire wear.

Here, when it is judged that the robot needs to have the tire replaced, a tire replacement early-warning will be carried out by either displaying tire replacement early-warning information on a display, or sending the tire replacement early-warning information to a mobile phone of an operator.

The method provided in the present embodiment improves the accuracy of the distance travelled by the robot by way of automatic compensation for the wheel diameter, thereby realizing the accurate positioning of the robot; and further, two ways of correcting its own current wheel diameter are provided, one of which is to determine a wheel diameter compensation value by means of searching in a list, which has the advantages of simple operation and less computation burden for a server and is especially suitable for cases where the same server controls a large number of robots to work, and the other of which is based on the principle that the theoretical number of tire revolutions of the robot is equal to the actual number of tire revolutions, which can accurately calculate the wheel diameter of the robot updated, thus accurately updating the wheel diameter of the robot; and on the basis of correcting its own wheel diameter, the robot can judge whether it needs to have the tire replaced, effectively protecting the robot from a malfunction caused by tire wear of the robot, improving the smoothness of the overall running of the robot, and improving the running safety of the robot, ensuring working safety in the case of a large number of robots.

Embodiment 2

Figure 2:
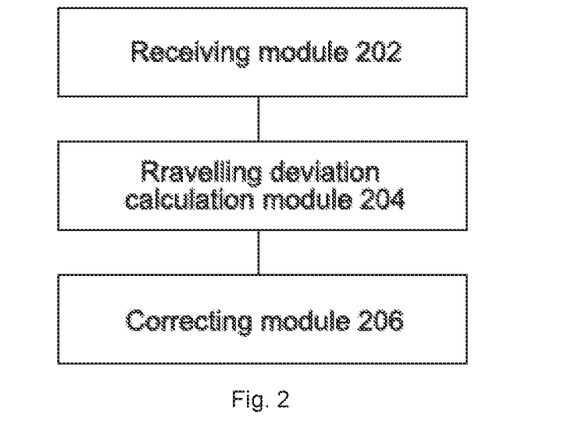
FIG. 2 shows a schematic structural view of a wheel diameter compensation apparatus for a robot provided according to Embodiment 2 of the present invention.

In order to further illustrate the wheel diameter compensation method for a robot mentioned above, the present embodiment provides a wheel diameter compensation apparatus for a robot, wherein the apparatus can be provided in a robot, and, as shown in FIG. 2, the apparatus includes:

a receiving module 202 configured to receive a travel instruction sent from a server, with the travel instruction instructing the robot to travel from a first location point to a second location point, wherein a plurality of location points are set in the work place, and the travel instruction includes a distance between the first location point and the second location point and a travel direction towards the second location point from the first location point;

a travelling deviation calculation module 204 configured to acquire a travelling deviation corresponding to travelling from the first location point to the second location point, the travelling deviation being a difference between a theoretical distance corresponding to actual number of tire revolutions of the robot and an actual distance; and a correcting module 206 configured to correct a current wheel diameter of the robot based on the distance between the first location point and the second location point and the travelling deviation.

Further, the travelling deviation calculation module 204 includes:

a first acquiring module configured to acquire a first displacement deviation of the robot from the first location point, and make the robot travel to the second location point in accordance with the distance and the travel direction included in the travel instruction;

a second acquiring module configured to acquire a second displacement deviation of the robot from the second location point when the robot travels to the second location point; and a travelling deviation calculating unit configured to calculate to obtain the travelling deviation corresponding to the robot travelling from the first location point to the second location point based on the first displacement deviation and the second displacement deviation.

Further, the above correcting module 206 includes:

a deviation-per-unit-distance calculation subunit configured to calculate, based on the distance between the first location point and the second location point and the travelling deviation, a travelling deviation per unit distance of the robot;

a wheel diameter compensation value searching subunit configured to search in a preset list to obtain a wheel diameter compensation value corresponding to the travelling deviation per unit distance; and a current wheel diameter correcting subunit configured to correct the current wheel diameter of the robot based on the searched wheel diameter compensation value.

Further, the correcting module 206 includes:

a first determining subunit configured to determine first number of tire revolutions of the robot based on the distance between the first location point and the second location point and the pre-stored current wheel diameter;

a second determining subunit configured to determine second number of tire revolutions of the robot based on the distance between the first location point and the second location point, the travelling deviation, and a corrected current wheel diameter; and a current wheel diameter updating subunit configured to calculate a corrected current wheel diameter using the relationship where the first number of tire revolutions is equal to the second number of tire revolutions, and update the current wheel diameter of the robot with the corrected current wheel diameter.

Further, the above apparatus further includes:

a compensation revolution number calculation module configured to calculate to obtain the number of tire revolutions required to travel to the second location point based on the second displacement deviation of the robot from the second location point; and a control module configured to control the robot to travel to the second location point based on the required number of tire revolutions, thereby correcting a final position of the robot.

Further, the above apparatus further includes:

a judging module configured to judge, based on the corrected current wheel diameter, whether the robot needs to have the tire replaced, and perform, when it is judged that the robot needs to have the tire replaced, a tire replacement early-warning.

Further, the above judging module includes:

a first judging unit configured to judge whether the corrected current wheel diameter reaches a preset range of wheel diameters, wherein if yes, it is determined that the robot needs to have the tire replaced;

or, a second judging unit configured to judge whether a difference between the corrected current wheel diameter and an initial wheel diameter of the robot reaches a preset difference threshold, wherein if yes, it is determined that the robot needs to have the tire replaced.

In the present embodiment, it is possible to simply and quickly judge, by the first judging unit and the second judging unit, whether the tire of the robot needs to be replaced, so as to prevent the robot from colliding with other robots due to severe wear.

The wheel diameter compensation apparatus for a robot provided according to the embodiment of the present invention may be a specific hardware on a device, or software or firmware installed on the device. The apparatus provided according to the embodiment of the present invention is implemented based on the same principle and creates the same technical effects with the foregoing embodiment of the method, and for parts of the embodiment of the apparatus that are not mentioned, reference can be made to corresponding disclosure in the foregoing embodiment of the method for brevity of the description. It would be clearly appreciated by those skilled in the art that for convenience and brevity of the description, specific operation processes of the systems, apparatuses and units described previously may be performed with reference to the corresponding processes in the foregoing embodiment of the method and will not be repeated herein.

Embodiment 3

Figure 3:
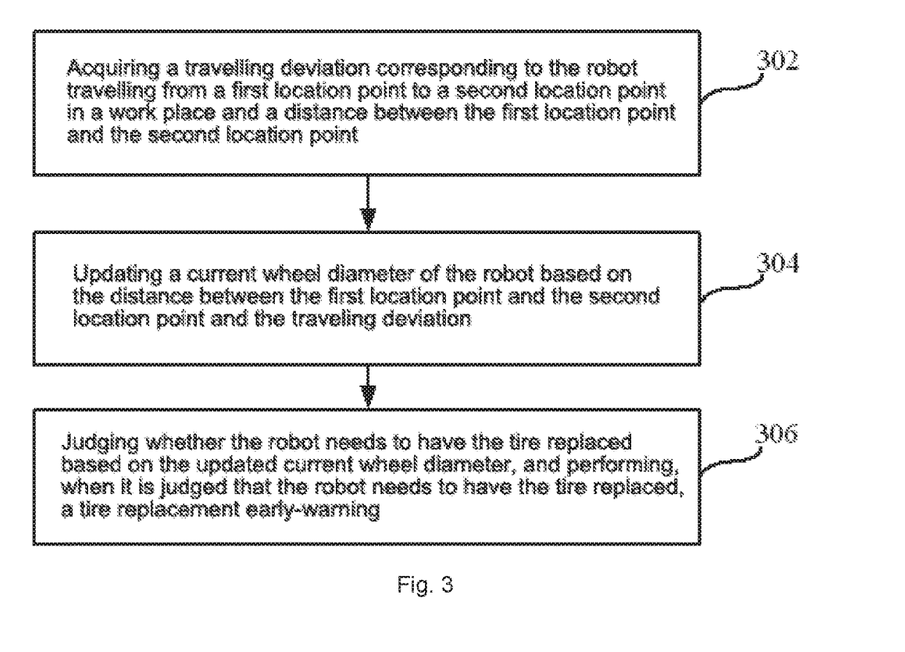
FIG. 3 shows a schematic view of a first flowchart of another wheel diameter compensation method for a robot provided according to Embodiment 3 of the present invention.

As shown in FIG. 1 which shows a schematic view of a first flowchart of another wheel diameter compensation method for a robot provided according to the embodiment of the present invention, a subject executing the method may be a background server for controlling the work of the robot, and the method includes at least the following steps:

Step 302: acquiring a travelling deviation corresponding to the robot travelling from a first location point to a second location point in a work place and a distance between the first location point and the second location point; wherein a plurality of location points are set in the work place, and the travelling deviation is a difference between a theoretical distance corresponding to the actual number of tire revolutions of the robot and an actual distance; and Step 304: updating a current wheel diameter of the robot based on the distance between the first location point and the second location point and the travelling deviation.

In Step 302, there may be a variety of implementation ways for the server acquiring the travelling deviation corresponding to the travelling of the robot from the first location point to the second location point in the work place.

For example, a distance S1 between the first location point and the second location point is pre-stored in the server, and when the robot travels from the first location point to the second location point, the robot reports its actual travelling distance S2 to the server, and the server may calculate to obtain the travelling deviation of the robot based on S1 and S2. In a preferred embodiment, acquiring the travelling deviation corresponding to the travelling of the robot from the first location point to the second location point in the work place includes the following processes: (1) receiving a reported first displacement deviation of the robot from the first location point when the robot is located at the first location point, and a reported second displacement deviation of the robot from the second location point when the robot is located at the second location point; and (2) calculating the travelling deviation corresponding to the robot travelling from the first location point to the second location point based on the first displacement deviation and the second displacement deviation.

Specifically, in the present embodiment, the place, where the robot works, is divided, in a tabular form, into several lattices with equal areas, each lattice serving as a location point. Each lattice is provided therein with an optical identification code, a center of the optical identification code coincide with a center of a corresponding location point, and the optical identification code may be a two-dimensional code. The bottom of the robot is provided with an optical identifier which is configured to identify the optical identification code and the optical identification code may be a camera head. In process (1), when the robot is at the first location point, the robot collects the optical identification code corresponding to the first location point through the optical identifier at the bottom. In the collected image, a center of the image represents a center of the position of the robot. The robot identifies a center of the optical identification code from the collected image and determines a distance between the center of the optical identification code and the center of the image so as to determine a first displacement deviation of the robot from the first location point, and reports the first displacement deviation to the server. Similarly, when the robot is at the second location point, the robot determines a second displacement deviation of the robot from the second location point in the same way, and reports it to the server. In process (2), the server performs calculation based on the first displacement deviation and the second displacement deviation to determine the travelling deviation corresponding to the robot travelling from the first location point to the second location point. For example, through the process (1) and process (2) as above, the server can receive the first displacement deviation and the second displacement deviation reported by the robot and accurately calculate the travelling deviation of the robot based on the first displacement deviation and the second displacement deviation. The server has less computation, which makes it especially suitable for work settings where the same server controls multiple robots.

In Step 302 above, the server also acquires the distance between the first location point and the second location point, and by combining the aforementioned ways of arrangement of the location points, the optical identification code and the optical identifier, the server in the present embodiment can acquire the distance between the first location point and the second location point by the following manner: the server numbers each location point in advance, and pre-stores positional information corresponding to each location point; the robot reports to the server the serial number of the first location point and the serial number of the second location point (such reporting may be performed when the first displacement deviation and the second displacement deviation are reported to the server); then the server determines the positional information of the first location point based on the serial number of the first location point, determines the positional information of the second location point based on the serial number of the second location point, and determines the distance between the first location point and the second location point based on the positional information of the first location point and the positional information of the second location point. In the present embodiment, the distance between the first location point and the second location point may be expressed by a physical unit such as meter, and may also be expressed by spaced positional intervals. For example, if the distance between the first location point and the second location point is 5 meters, the first location point is a location point numbered 1 and the second location point is a location point numbered 6, there are 5 positional intervals spaced between the two location points. In the present embodiment, the distance between the first location point and the second location point is acquired by means of acquiring the serial numbers of the location points, which has the advantage of light computation burden for the server and simple and convenient implementation.

In Step 304 above, the server updates the current wheel diameter of the robot based on the distance between the first location point and the second location point and the travelling deviation, which specifically includes: (1) calculating, based on the distance between the first location point and the second location point and the travelling deviation, a travelling deviation per unit distance of the robot; (2) searching in a preset list a wheel diameter compensation value corresponding to the travelling deviation per unit distance of the robot; and (3) updating the current wheel diameter of the robot based on the searched wheel diameter compensation value.

Specifically, taking a case where the robot has a travelling deviation of 5 cm and the distance between the first location point and the second location point is 5 meters or embodied as 5 positional intervals as an example, it may be calculated through the above process (1) that the travelling deviation per unit distance of the robot is 5 cm/5 meters, that is, there is a deviation of 1 cm per meter, whose numerical value is expressed as 0.01, or as a deviation of 1 cm per positional interval. In process (2) as above, a list, in which travelling deviations per unit distance correspond to wheel diameter compensation values, is preset in the server, and taking a travelling deviation per unit distance of 0.01, or a deviation of 1 cm per positional interval as an example, it may be obtained by searching in the list above that a wheel diameter compensation value is 2 cm. In process (2), the wheel diameter compensation value may also be determined by way of judging with a preset value, and for example, if the travelling deviation per unit distance is more than 0.05, the wheel diameter compensation value is 5 cm, and if the travelling deviation per unit distance is less than or equal to 0.05, the wheel diameter compensation value will be 2 cm. In process (3) as above, since the tire of the robot is less worn as the movement time increases, the current wheel diameter of the robot can be updated to 26 cm, taking a case, where the robot having a wheel diameter compensation value of 2 cm and a current wheel diameter of 28 cm, as an example.

In the present embodiment, the wheel diameter compensation value is determined by means of searching in a list, which has the advantages of simple operation and less computation burden for a server, and is especially suitable for the case where the same server controls a large number of robots to work.

In order to accurately compensate for the wheel diameter of the robot and accurately determine the updated wheel diameter, in Step 304 above, the updating by the server the current wheel diameter of the robot based on the distance between the first location point and the second location point and the travelling deviation may also be carried out by the following processes: (1) determining first number of tire revolutions of the robot based on the distance between the first location point and the second location point and the current wheel diameter of the robot; (2) determining second number of tire revolutions of the robot based on the distance between the first location point and the second location point, the travelling deviation and the updated wheel diameter of the robot; and (3) calculating to obtain the updated wheel diameter of the robot using the relationship where the first number of tire revolutions is equal to the second number of tire revolutions.

Specifically, supposing that M represents the distance between the first location point and the second location point, Y represents the travelling deviation of the robot, R0 represents the current wheel diameter (i.e., the pre-stored current wheel diameter) of the robot, R1 represents the updated wheel diameter (i.e., the actual wheel diameter after wear) of the robot, and pi indicates a ratio of a circle's circumference to its diameter. It can be seen that M refers to a theoretical distance travelled by the robot, and M+Y refers to an actual distance travelled by the robot. The control of the travelling of the robot by the server is based on the principle that number of tire revolutions of the robot is calculated based on the theoretical distance travelled by the robot and the current wheel diameter of the robot and the robot is controlled to move according to such number of revolutions, thus during a process of the robot moving from the first location point to the second location point, the theoretical number of tire revolutions of the robot is equal to the actual number of revolutions, that is, (M+Y)/(pi*R1) =M/(pi*R0), and since each of M, Y, pi, and R0 is known, the updated wheel diameter of the robot can be obtained by R1=((M+Y)*R0)/M, which is simplified into R1=R0+ (Y*R0)/M.

In the present embodiment, the updated wheel diameter of the robot can be accurately calculated based on the principle that the theoretical number of tire revolutions of the robot is equal to the actual number of tire revolutions, thereby accurately updating the wheel diameter of the robot.

Still further, the method further includes: Step 306 of judging whether the robot needs to have the tire replaced based on the updated current wheel diameter, and performing tire replacement early warning when it is judged that the robot needs to have the tire replaced. Here, judging whether the robot needs to have the tire replaced based on the updated current wheel diameter size specifically includes: (1) judging whether the updated current wheel diameter reaches a preset range of wheel diameters, wherein if yes, it is determined that the robot needs to have the tire replaced; or (2) judging whether a difference between the updated current wheel diameter and an initial wheel diameter of the robot reaches a preset difference threshold, wherein if yes, it is determined that the robot needs to have the tire replaced. For example, if the robot is so worn that its wheel diameter becomes 25 cm, or if the difference between the updated current wheel diameter of the robot and the initial wheel diameter of the robot exceeds 5 cm, it is determined that the robot to needs to have the tire replaced. In the present embodiment, it is possible to simply and quickly judge, by processes (1) and (2), whether the tire of the robot needs to be replaced, so as to prevent the robot from colliding with other robots due to severe tire wear.

Here, when it is judged that the robot needs to have the tire replaced, a tire replacement early-warning will be carried out by either displaying tire replacement early-warning information on a display, or sending the tire replacement early-warning information to a mobile phone of an operator.

The method provided in the present embodiment may be applied to work settings where a large number of robots are controlled by one server, in which the server controls the work of each robot in the same manner, updates the wheel diameter of each robot and achieves accurate positioning of the robots; and further, two ways of updating current wheel diameter of a robot itself are provided, one of which is to determine a wheel diameter compensation value by means of searching in a list, which has the advantages of simple operation and less computation burden for the server and is especially suitable for cases where the same server controls a large number of robots to work, and the other of which is based on the principle that the theoretical number of tire revolutions of the robot is equal to the actual number of revolutions, which can accurately calculate the wheel diameter of the robot updated, thereby accurately updating the wheel diameter of the robot; and the server can judge whether the robot needs to have the tire replaced, based on control of wheel diameter update. On the basis of the update of the wheel diameter of the robot, the method in the present embodiment can effectively protect the robot from a malfunction caused by tire wear of the robot, improve the smoothness of the overall running of the robot, improve the running safety of the robot, and ensure working safety in the case of a large number of robots.

Figure 4:
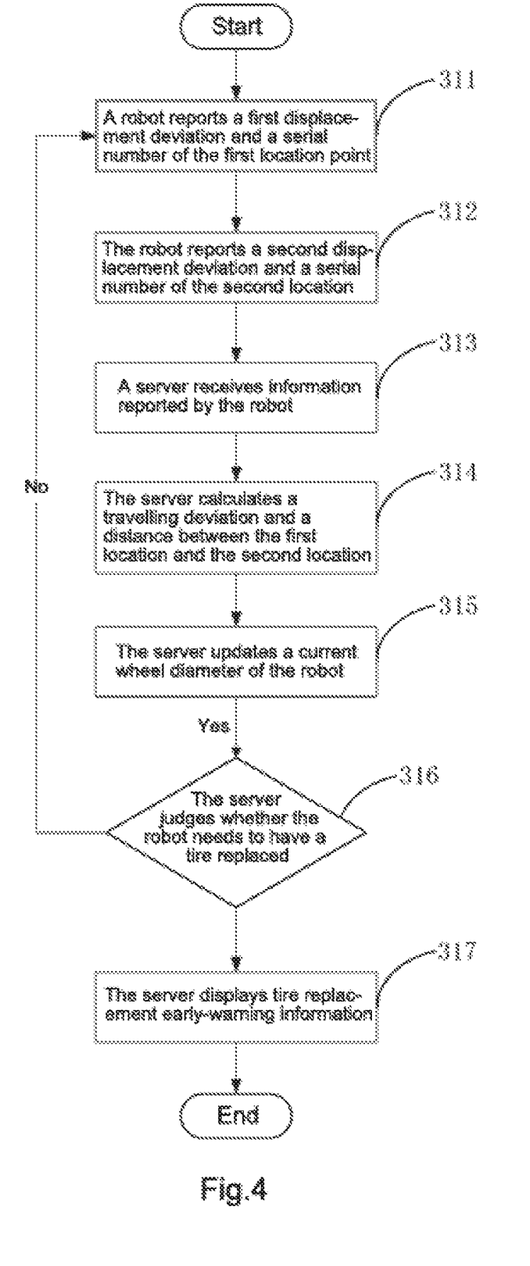
FIG. 4 shows a schematic view of a second flowchart of another wheel diameter compensation method for a robot provided according to Embodiment 3 of the present invention.

Referring to a schematic view of another flowchart of another wheel diameter compensation method for a robot provided according to the embodiment of the present invention as shown in FIG. 4, the method includes:

Step 311, the robot, when located at a first location point, reports a first displacement deviation thereof from the first location point and reports the serial number of the first location point to a server;

Step 312, the robot, when located at a second location point, reports a second displacement deviation thereof from the second location point and the serial number of the second location point to the server;

Step 313, the server receives the first displacement deviation and the second displacement deviation and the serial number of the first location point and the serial number of the second location point reported by the robot;

Step 314, the server calculates a travelling deviation of the robot based on the first displacement deviation and the second displacement deviation, and calculates a distance between the first location point and the second location point based on the serial number of the first location point, the serial number of the second location point and the pre-stored positional information of each of the location points;

Step 315, the server updates a current wheel diameter of the robot based on the distance between the first location point and the second location point and the travelling deviation above, wherein a specific method for updating may performed by updating by means of searching in a list as mentioned before, or updating by means of the aforementioned calculation;

Step 316, the server judges, based on the updated current wheel diameter, whether the robot needs to have a tire replaced, wherein if yes, it executes Step 317, and if no, it returns to Step 311; and Step 317, the server displays tire replacement early-warning information on a display screen.

With the method shown in FIG. 4, it is possible to effectively prevent the robot from having a travelling distance with a low accuracy, failing to be accurately positioned or even having a malfunction due to tire wear of the robot, thereby improving the smoothness and accuracy of the overall running of the robot, improving the running safety of the robot, and ensuring working safety in case of a large number of robots.

Embodiment 4

In order to further illustrate the another wheel diameter compensation method for a robot mentioned in Embodiment 3, the embodiment of the present invention further provides another wheel diameter compensation apparatus for a robot, configured to execute the another wheel diameter compensation method for a robot described above. Another wheel diameter compensation apparatus for c a robot in the present embodiment can be provided in a server that controls the work of robots.

Figure 5:
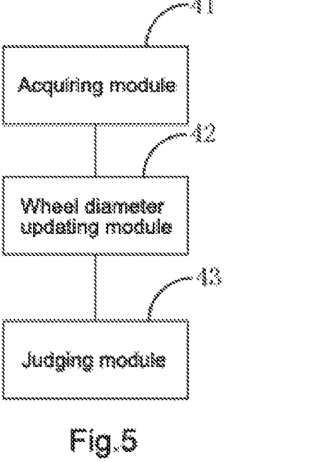
FIG. 5 shows a schematic view of a first structure of another wheel diameter compensation apparatus for a robot provided according to Embodiment 4 of the present invention.

As shown in FIG. 5, another wheel diameter compensation apparatus for a robot in the present embodiment includes:

an acquiring module 41 configured to acquire a travelling deviation corresponding to the robot travelling from a first location point to a second location point in a work place and a distance between the first location point and the second location point, wherein a plurality of location points are set in the work place, and the travelling deviation is a difference between a theoretical distance corresponding to the actual number of tire revolutions of the robot and an actual distance; and a wheel diameter updating module 42 configured to update a current wheel diameter of the robot based on the distance between the first location point and the second location point and the travelling deviation.

Figure 6:
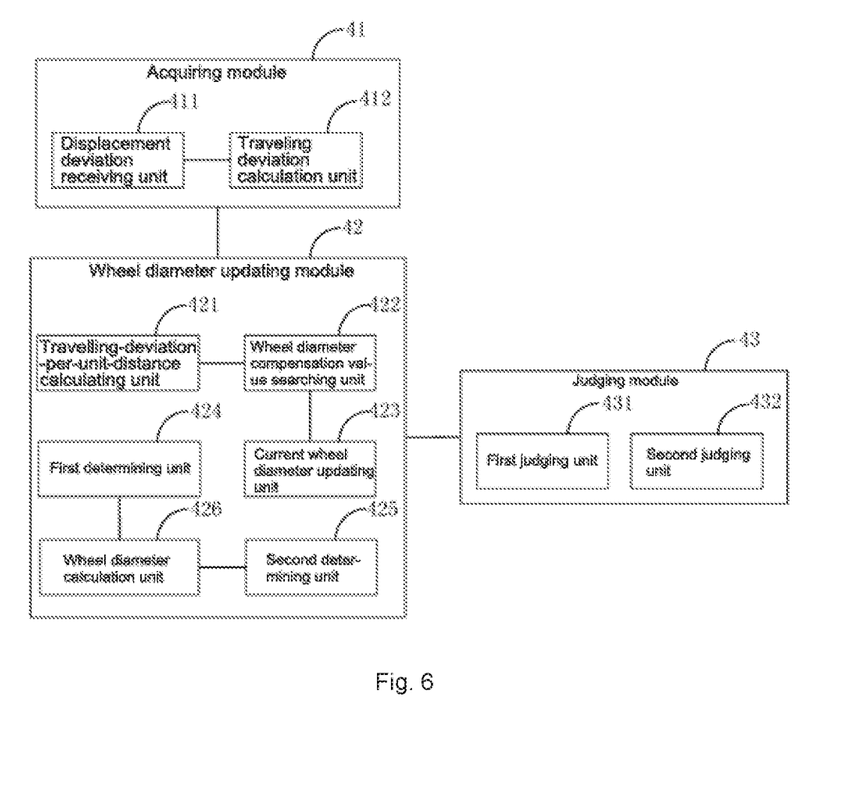
FIG. 6 shows a schematic view of a second structure of another wheel diameter compensation apparatus for a robot provided according to Embodiment 4 of the present invention.

Further, as shown in FIG. 6, in the present embodiment, the acquiring module 41 includes: a displacement deviation receiving unit 411 configured to receive a reported first displacement deviation of the robot from the first location point when the robot is located at the first location point, and a reported second displacement deviation of the robot from the second location point by the robot when the robot is located at the second location point; and a travelling deviation calculation unit 412 configured to calculate the travelling deviation corresponding to the robot travelling from the first location point to the second location point based on the first displacement deviation and the second displacement deviation. In the present embodiment, with the displacement deviation receiving unit 411 and the travelling deviation calculation unit 412, the server may receive the first displacement deviation and the second displacement deviation reported by the robot, and accurately calculate the travelling deviation of the robot based on the first displacement deviation and the second displacement deviation. The server has a light computation burden, which makes it especially suitable for work settings where the same server controls multiple robots.

Further, as shown in FIG. 6, in the present embodiment, the wheel diameter updating module 42 includes a travelling-deviation-per-unit-distance calculation unit 421 configured to calculate, based on the distance between the first location point and the second location point and the travelling deviation, a travelling deviation per unit distance of the robot; a wheel diameter compensation value searching unit 422 configured to search in a preset list a wheel diameter compensation value corresponding to the travelling deviation per unit distance of the robot; and a current wheel diameter updating unit 423 configured to update the current wheel diameter of the robot based on the searched wheel diameter compensation value. In the present embodiment, the wheel diameter compensation value is determined by means of searching in a list through the travelling-deviation-per-unit-distance calculation unit 421, the wheel diameter compensation value searching unit 422, and the current wheel diameter updating unit 423, which has the advantages of simple operation and less computation burden for a server, and is especially suitable for cases where the same server controls the work of a large number of robots.

Further, as shown in 6, in the present embodiment, the wheel diameter updating module 42 includes: a first determining unit 424 configured to determine first number of tire revolutions of the robot based on the distance between the first location point and the second location point and the current wheel diameter of the robot; a second determining unit 425 configured to determine second number of tire revolutions of the robot based on the distance between the first location point and the second location point, the travelling deviation, and an updated wheel diameter of the robot; and a wheel diameter calculation unit 426 configured to calculate an updated wheel diameter of the robot using the relationship where the first number of tire revolutions is equal to the second number of tire revolutions. In the present embodiment, the updated wheel diameter of the robot can be accurately calculated through the first determining unit 424, the second determining unit 425 and the wheel diameter calculation unit 426 based on the principle that the theoretical number of tire revolutions of the robot is equal to the actual number of revolutions, thereby accurately updating the wheel diameter of the robot.

Further, as shown in FIG. 5, the apparatus further includes:

a judging module 43 configured to judge, based on the updated current wheel diameter, whether the robot needs to have the tire replaced, and perform, when it is judged that the robot needs to have the tire replaced, a tire replacement early-warning.

Further, as illustrated in FIG. 6, the judging module 43 includes:

a first judging unit 431 configured to judge whether the updated current wheel diameter reaches a preset range of wheel diameters, wherein if yes, it is determined that the robot needs to have the tire replaced;

or, a second judging unit 432 configured to judge whether a difference between the updated current wheel diameter and an initial wheel diameter of the robot reaches a preset difference threshold, wherein if yes, it is determined that the robot needs to have the tire replaced.

In the present embodiment, it is possible to simply and rapidly judge whether the tire of the robot needs to be replaced through the first judging unit 431 and the second judging unit 432, so as to prevent the robot from colliding with other robots due to severe wear.

As described above, the apparatus provided in the present embodiment may be applied to work settings where a large number of robots are controlled by one server, in which the server controls the work of each robot in the same manner, updates the wheel diameter of each robot and achieves accurate positioning of the robots; and further, two ways of updating current wheel diameter of a robot itself are provided, one of which is to determine a wheel diameter compensation value by means of searching in a list, which has the advantages of simple operation and less computation burden for a server and is especially suitable for cases where the same server controls a large number of robots to work, and the other of which is based on the principle that the theoretical number of tire revolutions of the robot is equal to the actual number of revolutions, which can accurately calculate the wheel diameter of the robot updated, thereby accurately updating the wheel diameter of the robot; and the server can judge whether the robot needs to have the tire replaced, based on control of the wheel diameter update. The apparatus in the present embodiment can effectively protect the robot from a malfunction caused by tire wear of the robot, improve the smoothness of the overall running of the robot, improve the running safety of the robot, and ensure working safety in the case of a large number of robots.

The apparatus provided according to the embodiment of the present invention may be a specific hardware on a device, or software or firmware installed on the device. The apparatus provided according to the embodiment of the present invention is implemented based on the same principle and creates the same technical effects as the foregoing embodiment of the method, and for parts of the embodiment of the apparatus that are not mentioned, reference can be made to corresponding disclosure in the foregoing embodiment of the method for brevity of the description. It would be clearly appreciated by those skilled in the art that for convenience and brevity of the description, specific operation processes of the systems, apparatuses and units described previously may be performed with reference to the corresponding processes in the foregoing embodiment of the method and will not be repeated herein.

It should be understood that, in all the above embodiments provided in the present invention, the disclosed apparatuses and methods may be implemented in other ways. The embodiments of the apparatuses described above are merely illustrative in nature. For example, the division of the units is only by logical functions, and additional division modes may be adopted in practical implementation. For another example, multiple units or components may be combined or integrated into another system, or some features may be omitted or not executed. In addition, the mutual coupling, or direct coupling or communication connection illustrated or discussed herein may be implemented via indirect coupling or communication connection between some communication interfaces, apparatuses or units, which may be electronic, mechanical or in other forms.

The units described as separate components may be or not be separated physically, and the components illustrated as units may be or not be physical units, namely, they may be located at one place or they may be distributed onto multiple network units. Some or all of the units may be selected as actually required to fulfill the purposes of the technical solutions of the present embodiments.

Besides, the individual functional units in the embodiments of the present invention may be integrated into one processing unit, or may be physically stand-alone, or two or more of the units may be integrated into one unit.

When implemented in the form of a software functional unit and sold or used as a stand-alone product, the functions may be stored in a computer-readable storage medium. Based on such understanding, the technical solution of the present invention in essence, or a part thereof contributing to the prior art, or any part of the technical solution, may be embodied in the form of a software product. The computer software product is stored in a storage medium, and incorporates several instructions for allowing a computer apparatus (which may be a personal computer, server, network apparatus or the like) to execute all or some of the steps of the method described in each embodiment of the present invention. The aforesaid storage medium includes various media capable of storing program codes, such as a USB flash disk, a mobile hard disk, a read-only memory (ROM), a random access memory (RAM), a magnetic disk or an optical disk.

It should be noted that similar reference numerals and letters refer to similar items in the following figures, and thus once an item is defined in one figure, it may not be further defined or explained in the following figures. In addition, terms such as "first", "second" and "third" are used only for distinguishing the description, and should not be understood as indicating or implying to have importance in relativity.

Finally, it should be noted that the embodiments described above are merely specific embodiments of the present invention, which are intended to illustrate the technical solutions of the invention and not intended to limit the invention, and to which the scope of protection of the invention is not limited. Although the present invention has been illustrated in detail with reference to the foregoing embodiments, it would be understood by those skilled in the art that the technical solutions described in the foregoing embodiments can be modified, or variations thereof can be readily conceived of, or some of the technical features thereof can be equivalently replaced by those skilled in the art within the technical scope disclosed in the present invention; and these modifications, variations or replacements do not make the essence of the corresponding technical solution depart from the spirit and scope of the technical solutions of the embodiments of the invention, and are therefore to be encompassed within the scope of protection of the present invention. Therefore, the scope of protection of the present invention is to be defined by the appended claims.

The invention claimed is:

1. A wheel diameter compensation method for a robot, comprising:
   receiving, by a robot at a first location point in a work place, a travel instruction sent from a server, wherein the travel instruction instructs the robot to travel to a second location point, wherein a plurality of location points are set in the work place, and the travel instruction includes a distance between the first location point and the second location point and a travel direction towards the second location point from the first location point;
   acquiring, by the robot, a travelling deviation corresponding to travelling from the first location point to the second location point, the travelling deviation being a difference between a theoretical distance corresponding to actual number of tire revolutions of the robot and an actual distance; and
   the robot correcting its own current wheel diameter based on the travelling deviation and the distance between the first location point and the second location point,
   wherein the step of the robot correcting its own current wheel diameter based on the travelling deviation and the distance between the first location point and the second location point includes:
   the robot calculating its own travelling deviation per unit distance, based on the distance between the first location point and the second location point and the travelling deviation;
   the robot searching, in a preset list, a wheel diameter compensation value corresponding to the travelling deviation per unit distance; and
   the robot correcting its own current wheel diameter based on the searched wheel diameter compensation value.

2. The method according to claim 1, wherein the step of acquiring by the robot a travelling deviation corresponding to travelling from the first location point to the second location point comprises:
   the robot acquiring a first displacement deviation of the robot from the first location point, and travelling to the second location point in accordance with the distance and the travel direction included in the travel instruction;
   the robot acquiring a second displacement deviation of the robot from the second location point when the robot travels to the second location point; and
   the robot calculating the travelling deviation corresponding to the robot travelling from the first location point to the second location point, based on the first displacement deviation and the second displacement deviation.

3. The method according to claim 2, wherein the step of the robot correcting its own current wheel diameter of the robot based on the travelling deviation and the distance between the first location point and the second location point includes:
   the robot determining first number of tire revolutions of the robot based on the distance between the first location point and the second location point and a pre-stored current wheel diameter;
   the robot determining second number of tire revolutions of the robot based on the distance between the first location point and the second location point, the travelling deviation and a corrected wheel diameter; and
   the robot calculating a corrected wheel diameter using a relationship where the first number of tire revolutions is equal to the second number of tire revolutions, and updating the robot's own current wheel diameter with the corrected wheel diameter.

4. The method according to claim 2, wherein the method further comprises:
   the robot calculating number of tire revolutions required to travel to the second location point, based on the second displacement deviation of the robot from the second location point; and
   controlling the robot to travel to the second location point based on the required number of tire revolutions so as to correct a final position of the robot.

5. The method according to claim 4, further comprising: judging whether the robot needs to have the tire replaced based on a corrected current wheel diameter, and performing, when it is judged that the robot needs to have the tire replaced, a tire replacement early-warning.

6. The method according to claim 5, wherein the step of judging whether the robot needs to have the tire replaced based on a corrected current wheel diameter includes:
   judging whether the corrected current wheel diameter reaches a preset range of wheel diameters, wherein if yes, it is determined that the robot needs to have the tire replaced;
   or judging whether a difference between the corrected current wheel diameter and an initial wheel diameter of the robot reaches a preset difference threshold, wherein if yes, it is determined that the robot needs to have the tire replaced.

7. A wheel diameter compensation apparatus for a robot, comprising:
a receiving module, configured to receive a travel instruction sent from a server, wherein the travel instruction instructs the robot to travel from a first location point to a second location point, wherein a plurality of location points are set in a work place, and the travel instruction includes a distance between the first location point and the second location point and a travel direction towards the second location point from the first location point;
a travelling deviation calculation module, configured to acquire a travelling deviation corresponding to travelling from the first location point to the second location point, the travelling deviation being a difference between a theoretical distance corresponding to actual number of tire revolutions of the robot and an actual distance; and
a correcting module, configured to correct a current wheel diameter of the robot based on the distance between the first location point and the second location point and the travelling deviation;
wherein the correction module includes:
a deviation-per-unit-distance calculation subunit, configured to calculate, based on the distance between the first location point and the second location point and the travelling deviation, a travelling deviation per unit distance of the robot;
a wheel diameter compensation value searching subunit, configured to search in a preset list a wheel diameter compensation value corresponding to the travelling deviation per unit distance; and
a current wheel diameter correcting subunit, configured to correct the current wheel diameter of the robot based on the searched wheel diameter compensation value.

8. The apparatus according to claim 7, wherein the travelling deviation calculation module includes:
a first acquiring unit, configured to acquire a first displacement deviation of the robot from the first location point, and make the robot travel to the second location point in accordance with the distance and the travel direction included in the travel instruction;
a second acquiring unit, configured to acquire a second displacement deviation of the robot from the second location point, when the robot travels to the second location point; and
a travelling deviation calculation unit, configured to calculate the travelling deviation corresponding to the robot travelling from the first location point to the second location point based on the first displacement deviation and the second displacement deviation.

9. The apparatus according to claim 8, wherein the correcting module includes:
a first determining subunit, configured to determine first number of tire revolutions of the robot based on the distance between the first location point and the second location point and a pre-stored current wheel diameter;
a second determining subunit, configured to determine second number of tire revolutions of the robot based on the distance between the first location point and the second location point, the travelling deviation, and a corrected current wheel diameter; and a current wheel diameter updating subunit, configured to calculate the corrected current wheel diameter using a relationship where the first number of tire revolutions is equal to the second number of tire revolutions, and update the current wheel diameter of the robot with the corrected current wheel diameter.

10. The apparatus according to claim 7, wherein the apparatus further comprises:
a compensation revolution number calculation module, configured to calculate number of tire revolutions required to travel to the second location point based on the second displacement deviation of the robot from the second location point; and
a controlling module, configured to control the robot to travel to the second location point based on the required number of tire revolutions, thereby correcting a final position of the robot.

11. The apparatus according to claim 10, wherein the apparatus further comprises:
a judging module, configured to judge, based on the corrected current wheel diameter size, whether the robot needs to have the tire replaced, and performing, when it is judged that the robot needs to have the tire replaced, a tire replacement early-warning.

12. The apparatus according to claim 11, wherein the judging module includes:
a first judging unit, configured to judge whether the corrected current wheel diameter reaches a preset range of wheel diameters, wherein if yes, it is determined that the robot needs to have the tire replaced;
or
a second judging unit, configured to judge whether a difference between the corrected current wheel diameter and an initial wheel diameter of the robot reaches a preset difference threshold, wherein if yes, it is determined that the robot needs to have the tire replaced.

13. A wheel diameter compensation method for a robot, comprising:
acquiring a travelling deviation corresponding to the robot travelling from a first location point to a second location point in a work place and a distance between the first location point and the second location point; wherein a plurality of location points are set in the work place, and the travelling deviation is a difference between a theoretical distance corresponding to an actual number of tire revolutions of the robot and an actual distance; and
updating a current wheel diameter of the robot based on the distance between the first location point and the second location point and the travelling deviation;
wherein the step of updating a current wheel diameter of the robot based on the distance between the first location point and the second location point and the travelling deviation includes:
calculating, based on the distance between the first location point and the second location point and the travelling deviation, a travelling deviation per unit distance of the robot;
searching in a preset list a wheel diameter compensation value corresponding to the travelling deviation per unit distance; and
updating the current wheel diameter of the robot based on the searched wheel diameter compensation value.

14. The method according to claim 13, wherein the step of acquiring the travelling deviation corresponding to the robot travelling from a first location point to a second location point in a work place includes:
receiving a reported first displacement deviation of the robot from the first location point when the robot is located at the first location point, and a reported second displacement deviation of the robot from the second location point when the robot is located at the second location point; and
calculating the travelling deviation corresponding to the robot travelling from the first location point to the second location point based on the first displacement deviation and the second displacement deviation.

15. The method according to claim 14, wherein the step of updating a current wheel diameter of the robot based on the distance between the first location point and the second location point and the travelling deviation includes:
determining first number of tire revolutions of the robot based on the distance between the first location point and the second location point and the current wheel diameter of the robot;
determining second number of tire revolutions of the robot based on the distance between the first location point and the second location point, the travelling deviation and the updated wheel diameter of the robot; and
calculating the updated wheel diameter of the robot using the relationship where the first number of tire revolutions is equal to the second number of tire revolutions.

16. The method according to claim 13, further comprising: judging whether the robot needs to have the tire replaced based on the updated current wheel diameter, and performing, when it is judged that the robot needs to have the tire replaced, a tire replacement early-warning.

17. The method according to claim 16, wherein the judging whether the robot needs to have the tire replaced based on the updated current wheel diameter includes:
judging whether the updated current wheel diameter reaches a preset range of wheel diameters, wherein if yes, it is determined that the robot needs to have the tire replaced;
or
judging whether a difference between the updated current wheel diameter size and an initial wheel diameter of the robot reaches a preset difference threshold, wherein if yes, it is determined that the robot needs to have the tire replaced.

18. A wheel diameter compensation apparatus for a robot, comprising:
an acquiring module, configured to acquire a travelling deviation corresponding to the robot travelling from a first location point to a second location point in a work place and a distance between the first location point and the second location point, wherein a plurality of location points are set in the work place, and the travelling deviation is a difference between a theoretical distance corresponding to the actual number of tire revolutions of the robot and an actual distance; and
a wheel diameter updating module, configured to update a current wheel diameter of the robot based on the distance between the first location point and the second location point and the travelling deviation;
wherein the wheel diameter updating module includes:
a travelling-deviation-per-unit-distance calculation unit, configured to calculate, based on the distance between the first location point and the second location point and the travelling deviation, a travelling deviation per unit distance of the robot;
a wheel diameter compensation value searching unit, configured to search in a preset list a wheel diameter compensation value corresponding to the travelling deviation per unit distance of the robot; and
a current wheel diameter updating unit, configured to update the current wheel diameter of the robot based on the searched wheel diameter compensation value.

19. The apparatus according to claim 18, wherein the acquiring module includes:
a displacement deviation receiving unit, configured to receive a reported first displacement deviation of the robot from the first location point reported when the robot is located at the first location point, and a reported second displacement deviation of the robot from the second location point when the robot is located at the second location point; and
a travelling deviation calculation unit, configured to calculate the travelling deviation corresponding to the robot travelling from the first location point to the second location point based on the first displacement deviation and the second displacement deviation.

20. The apparatus according to claim 19, wherein the wheel diameter updating module includes:
a first determining unit, configured to determine first number of tire revolutions of the robot based on the distance between the first location point and the second location point and the current wheel diameter of the robot;
a second determining unit, configured to determine second number of tire revolutions of the robot based on the distance between the first location point and the second location point, the travelling deviation, and the updated wheel diameter of the robot; and
a wheel diameter calculation unit, configured to calculate the updated wheel diameter of the robot using a relationship where the first number of tire revolutions is equal to the second number of tire revolutions.

21. The apparatus according to claim 18, wherein the apparatus further comprises:
a judging module, configured to judge, based on the updated current wheel diameter, whether the robot needs to have the tire replaced, and perform, when it is judged that the robot needs to have the tire replaced, a tire replacement early-warning.

22. The apparatus according to claim 21, wherein the judging module includes:
a first judging unit, configured to judge whether the updated current wheel diameter reaches a preset range of wheel diameters, wherein if yes, it is determined that the robot needs to have the tire replaced;
or
a second judging unit, configured to judge whether a difference between the updated current wheel diameter size and an initial wheel diameter of the robot reaches a preset difference threshold, wherein if yes, it is determined that the robot needs to have the tire replaced.

* * * * *